US007146641B2

(12) United States Patent
Elgressy et al.

(10) Patent No.: US 7,146,641 B2
(45) Date of Patent: Dec. 5, 2006

(54) METHOD AND SYSTEM FOR THE PREVENTION OF UNDESIRABLE ACTIVITIES OF EXECUTABLE OBJECTS

(75) Inventors: Doron Elgressy, Haifa (IL); Fabian Ben Aderet, Migdal Haemek (IL)

(73) Assignee: Computer Associates Think, Inc., Islandia, NY (US)

( * ) Notice: Subject to any disclaimer, the term of this patent is extended or adjusted under 35 U.S.C. 154(b) by 476 days.

(21) Appl. No.: 09/811,848
(22) Filed: Mar. 19, 2001

(65) Prior Publication Data
US 2002/0129278 A1    Sep. 12, 2002

Related U.S. Application Data

(63) Continuation of application No. PCT/IL99/00539, filed on Oct. 13, 1999.

(30) Foreign Application Priority Data
Oct. 15, 1998 (IL) ........................ 126587

(51) Int. Cl.
G06F 11/00 (2006.01)
G06F 11/30 (2006.01)
G06F 15/173 (2006.01)
G06F 15/177 (2006.01)
G06F 12/00 (2006.01)
G06F 17/30 (2006.01)
G06F 9/46 (2006.01)
H04L 29/06 (2006.01)

(52) U.S. Cl. ........................ 726/22; 709/220; 709/225; 713/188; 711/147; 711/148
(58) Field of Classification Search ................ 713/201, 713/200, 188; 709/225, 224, 227, 229, 220; 726/22; 711/147, 148
See application file for complete search history.

(56) References Cited

U.S. PATENT DOCUMENTS 5,623,600 A * 4/1997 Ji et al. ........................ 713/201
6,167,520 A * 12/2000 Touboul ........................ 713/200

FOREIGN PATENT DOCUMENTS

EP        871134 A2      10/1998
WO     WO 9840993        9/1998

OTHER PUBLICATIONS

Micheal Shoffner and Merlin Hughes "Java and Web-Executable Object Security", Nov. 1996: Java and Network Security, pp. 1-7.*
Shoffner, Micheal and Hughes, Merlin "Java and Web-Executable Object Security", Nov. 1996; Java and Network Security, pp. 1-7.*
Drew Dean et al., "Java Security: From HotJava to Netscape and Beyond" Proceedings of the IEEE Comp. Soc. Press vol. Symp., 17, 1996, pp. 190-200.
Nigel Edwards et al., "High Security Web Servers and Gateways" Computer Networks and ISDN Systems, NL, Norl Holland Publishing, vol. 29, No. 8-13, Sep. 1, 1997, pp. 927-938.

* cited by examiner

Primary Examiner—Emmanuel L. Moise
Assistant Examiner—Courtney D. Fields
(74) Attorney, Agent, or Firm—Baker Botts L.L.P.

(57) ABSTRACT

A method of preventing undesirable activities of Executable Objects via an application, comprising denying to the same application, or one or more of its threads, access to a secured resource if the application, or one or more of its threads, has previously exhibited Internet behavior and has not met a specific condition for accessing the secured resource, and denying the application, or one or more of its threads, Internet behavior if, at a time access is sought to the Internet, the application, or one or more of its threads is accessing a secured resource.

32 Claims, 2 Drawing Sheets

_US 7,146,641 B2_

METHOD AND SYSTEM FOR THE PREVENTION OF UNDESIRABLE ACTIVITIES OF EXECUTABLE OBJECTS

This application is a continuation of PCT International application No. PCT/IL99/00539 filed Oct. 13, 1999 designating the United States of America and which was published in English.

FIELD OF THE INVENTION

The present invention relates to the security management of computer networks. More particularly, the invention relates to methods and systems for preventing undesirable activities of undesirable Executable Objects in a workstation of a computer network.

BACKGROUND OF THE INVENTION

The Internet has developed very much both in respect of its contents and of the technology employed, since it began a few years ago. In the early days of the Internet, web sites included text only, and after a while graphics was introduced. As the Internet developed, many compressed standards, such as pictures, voice and video files, were developed and with them programs used to play them (called "players"). Initially, such files were downloaded to the user's workstation only upon his request, and extracted only by the appropriate player, and after a specific order from the user.

When, in the natural course of the development of the World Wide Web the search for a way to show nicer, interactive and animated Web Pages began, Sun Microsystems Inc. developed Java—a language that allows the webmaster to write a program, a list of commands—Network Executables—that will be downloaded to the user workstation without his knowledge, and executed by his browser at his workstation. The executables are used, e.g., to provide photographic animation and other graphics on the screen of the web surfer. Such executables have some ways approaching the user workstation's resources, which lead to a great security problem. Although some levels of security were defined in the Java language, it was very soon that a huge security hole was found in the language.

Since Java was developed, Microsoft developed ActiveX, which is another Network Executable format, also downloaded into the workstation. ActiveX has also security problems of the same kind.

The Internet has been flooded with "Network Executables" that may be downloaded—deliberately or without the knowledge of the users—into workstations within organizations. These codes generally contain harmless functions. Although usually safe, they may not meet the required security policy of the organization.

Once executed, codes may jam the network, cause considerable irreversible damage to the local database, workstations and servers, or result in unauthorized retrieval of information from the servers/workstations. Such elements may appear on Java applets, ActiveX components, DLLs and other object codes, and their use is increasing at an unparalleled pace. The majority of these small programs are downloaded into the organization unsolicited and uncontrolled. The enterprise has no way of knowing about their existence or execution and there is no system in place for early detection and prevention of the codes from being executed.

The security problem was solved partially by the browser manufacturers which allow the user to disable the use of executables. Of course this is not a reasonable solution, since all the electronic commerce and advertising are based on the use of executables. The security problem is much more serious once such an executable can approach the enterprise servers, databases and other workstations.

In a copending patent application of the same applicant herein, IL 120420, filed on Mar. 10, 1997 (and on Feb. 23, 1998 as PCT/IL98/00083), the specification of which is incorporated herein by reference, a method is described and claimed, for selectively preventing the downloading and execution of undesired Executable Objects in a computer, which comprises the steps of:

(a) providing one or more Control Centers, each connected to one or more gateways, each gateway serving one or more end user computers;

(b) providing means coupled to each of said gateways, to detect Executable Objects reaching said gateway, to analyze the header of each of said Executable Objects, and to determine the resources of the computer that the Executable Object needs to utilize;

(c) providing means coupled to each of said gateways, to store each end user computer Security Policy representing the resources, or combination of resources, that the administrator allows or does not allow an Executable Object to utilize within its destination, wherein the Security Policy is received from and/or stored in each of said one or more Control Centers;

(d) when an Executable Object is detected at the gateway:
  1. analyzing the header of said Executable Object;
  2. determining the resources of the computer that the Executable Object needs to utilize;
  3. comparing the resources of the computer that the Executable Object needs to utilize with the Security Policy and;
    (i) if the resources of the computer that the Executable Object needs to utilize are included in the list of the resources allowed for use by the Security Policy, allowing the Executable Object to pass through the gateway and to reach the computer which has initiated its downloading; and
    (ii) if the resources of the computer that the Executable Object needs to utilize are included in the list of the resources prohibited for use by the Security Policy, preventing the Executable Object from passing through the gateway, thereby preventing it from reaching the computer which has initiated its downloading.

A Control Center (CC) may be a central control unit, e.g., a PC or other computer, which is connected to a plurality of gateways, and which updates the memory means containing relevant date, e.g., the Security Policy. Once the CC is updated, e.g., by the addition of an additional limitation to the Security Policy, all gateways are updated at once. The use of the CC to control the operation of the security elements of the gateways obviates the need (which exists in prior art systems) to update each gateway every time that a change in policy is made.

A LAN Local Area Network) may be (but is not limited to), e.g., a network of computers located in an office or building. The LAN is typically connected to outside communications networks, such as the World Wide Web, or to more limited LANs, e.g., of a client or supplier, through one or more gateways. The larger the organization, the larger the number of gateways employed, in order to keep communications at a reasonable speed.

Generally speaking, a LAN can also be made of a plurality of smaller LANs, located geographically nearby or far apart, but even if small LANs are found within the same organization, the security requirements may vary from one department to the other, and it may be necessary to keep high security levels, including preventing Executables from migrating from one department to the other, even within the same organization.

The means coupled to each of said gateways, to detect Executable Objects reaching said gateway, to analyze the header of each of said Executable Objects, and to determine the resources of the computer that the Executable Object needs to utilize may be of many different types. Typically, the executable object is "trapped" and analyzed at the gateway by listening on the communication line to the TCP/IP protocol as well as to the object transfer protocols, such as SMTP, HTTP, FTP, etc. Hooking into the communication line and extracting the contents of the header of the executable object are steps which are understood by the skilled person, and which can be effected by means of conventional programming, and they are therefore not described herein in detail, for the sake of brevity.

Once the header of the Executable Object (EO) has been analyzed, comparing the resources of the computer that the EO needs to utilize with the Security Policy can be easily done, e.g., by comparing them with a look-up table provided to the gateway by the CC, which represents the Security Policy. Comparison can also be carried out against the data stored in the CC, and in such a case specific memory means and comparing means may not be necessary in the gateway. However, speed and performance considerations will often dictate that such operations be carried out at the gateway itself.

Prior art solutions provide for the analysis of communication taking place via a single port, Port 80, which is the port commonly employed for web surfing. However, today it is possible to surf the net through ports other than Port 80, while the HTTP server of the user, according to currently available technology, cannot work on a plurality of ports. Therefore, if more than one user employ a gateway simultaneously, prior art systems are ineffective since they are not suitable for the simultaneous analysis of communication taking place via other ports.

Another severe drawback is that a very strong HTTP server is needed to serve a plurality of users, when operating according to the prior art method.

In order to permit to analyze the executables "on the fly", without hindering the downloading and he operation of harmless executables, another copending patent application of the same applicants herein (121815, filed Sep. 22, 1997, and corresponding PCT application PCT/IL98/00082, filed on Feb. 23, 1998) provides a method for processing Executable Objects, comprising:

(a) providing analysis means capable of non-interfering analysis of data packets transmitted on a communication line between a browser and an HTTP server on the web, said communication line being established through a gateway;

(b) analyzing the handshake between said browser and said server, to detect a "GET_" command sent by the user and an HTTP code sent in response by said server;

(c) when such an HTTP code is detected, analyzing the data packets transmitted by said server to said browser, by:

(1) providing ordering means to order data packets received in non-sequential order, and to forward them in sequential order to header checking means;

(2) checking the data packets so as to analyze the contents of the header of the Executable Object, and to identify the resources of the system that it needs to employ;

(3) transmitting to said gateway data representing the resources of the system that the Executable Object needs to utilize; and (4) providing data packet suppressing means coupled to said gateway, such that if the resources of the system that the Executable Object needs to utilize are not permitted according to the security policy set by the administrator, at least one data packet belonging to the 4Executable Object is suppressed, altered or damaged, so as to prevent the execution thereof by the browser.

The ever changing scene of Internet systems, however, requires that new solutions be provided to new threats which develop continuously, to add to the security provided by existing methods. Specifically, new Internet browsers are equipped with expanded capabilities, in addition to those needed for browsing the Internet, such as the ability to access local files and directories. Furthermore, other applications, such as, for instance, MS-Word or Visual-C++, allow browsing to be carried out directly without the need for an additional browser. In this situation, the separation that existed conventionally between Internet applications and other programs, does no longer exist. As a result, undesirable Executable Objects may be allowed access through "secure" applications, viz., through applications, such as a word processor, that were previously considered safe inasmuch as they did not allow for the access of EOs.

The art has so far failed to provide a solution to this problem, and it is clear that such a solution is urgently needed.

SUMMARY OF THE INVENTION

It is an object of the present invention to provide a method for preventing undesirable activities of Executable Objects, that overcomes the aforesaid drawbacks of prior art systems.

It is another object of the invention to provide such a method which is easy to implement and which does not require hardware changes.

It is a further object of the invention to provide a method which prevents an application that has been exposed to the Internet to access selected resources.

Other advantages and objects of the invention will become apparent as the description proceeds.

The method for preventing undesirable activities of Executable Objects via an application, according to the invention, comprises denying to the same application, or one or more of its threads, access to a secured resource if it has previously exhibited Internet behavior and has not met a specific condition for accessing said resource, and denying said application, or one or more of its threads, Internet behavior if, at the time access is sought, it is accessing-a secured resource.

According to a preferred embodiment of the invention the method comprises recording in a memory events representative of Internet behavior, keeping a record of all resources that are to be kept secured and when an application that has previously exhibited Internet behavior attempts to access one such secured resource, denying access to said secured resource, unless:

At least a predetermined period of time has passed since the last Internet behavior; or It has performed at least a predetermined number of operations after exhibiting Internet behavior; or Another preset condition has been fulfilled.

The preset conditions that can be employed for this purpose are many, and suitable conditions for a specific system will be easily recognized by the skilled person and may comprise, for instance, the exercise of control over the execution of downloadables received during Internet behavior, to ensure that no unexecuted downloadable may access the secured resource. According to one preferred embodiment of the invention, for instance, the preset condition comprises the analysis of the downloadables to ascertain that they are harmless.

According to a preferred embodiment of the invention Internet behavior is blocked by disabling the network connection creation or specific protocols, such as HTTP, FTP, SMTP, etc., or by disallowing the transfer of objects (EOs) through a protocol. However, if so desired, the access to trusted sites need not be disabled.

According to another preferred embodiment of the invention access to a secured resource is blocked by disabling a thread using a specific system service that is used to access the secured resource.

The invention also encompasses apparatus for preventing undesirable activities of Executable Objects via an application, comprising a memory for storing a record of Internet behavior of a plurality of applications, and means for denying to the same application access to a secured resource if it has previously exhibited Internet behavior and has not met a specific condition for accessing said resource, and further for denying said application, or one or more of its threads, Internet behavior if, at the time access is sought, it is accessing a secured resource.

The invention is further directed to a system for preventing undesirable activities of Executable Objects via an application, comprising a computer on which one or more applications are to run, said computer being connectable to the Internet, or intranet or extranet, said computer being provided with a memory for storing a record of Internet behavior of each of said plurality of applications, and means for denying to the same application access to a secured resource if it has previously exhibited Internet behavior and has not met a specific condition for accessing said resource, and further for denying said application, or one or more of its threads, Internet behavior if, at the time Internet behavior is exhibited, it is accessing a secured resource.

Throughout this specification, whenever reference is made to the Internet, it is understood that the same applies, mutatis mutandis, to any other type of network, e.g., an Intranet or Extranet, and the skilled person will easily understand that all that is said with reference to the Internet is equally applicable, with due modifications, to other types of networks.

DETAILED DESCRIPTION OF PREFERRED EMBODIMENTS

Figure 1A:
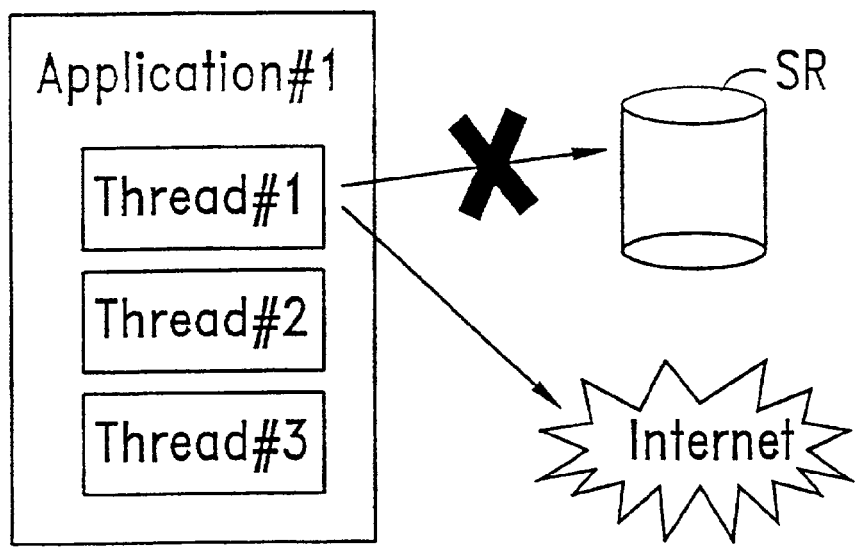
FIGS. 1A and 1B schematically illustrates two alternative situations in which an application that has been exposed to the Internet is denied access to secured resources.

Looking now at FIG. 1A, a situation is illustrated in which an Application (indicated as "Application #1") tries to reach through one of its threads (in the figure, Thread #1) a secured resource, SR. The Thread #1 (or any other thread of the same application) has previously exhibited Internet behavior (Internet behavior meaning that an application opens a connection to the Internet). This behavior has been recorded in memory means (not shown in the figure), along with the details of the event. In the option detailed in FIG. 1A, any other thread of the same application is prevented from accessing the SR.

Figure 1B:
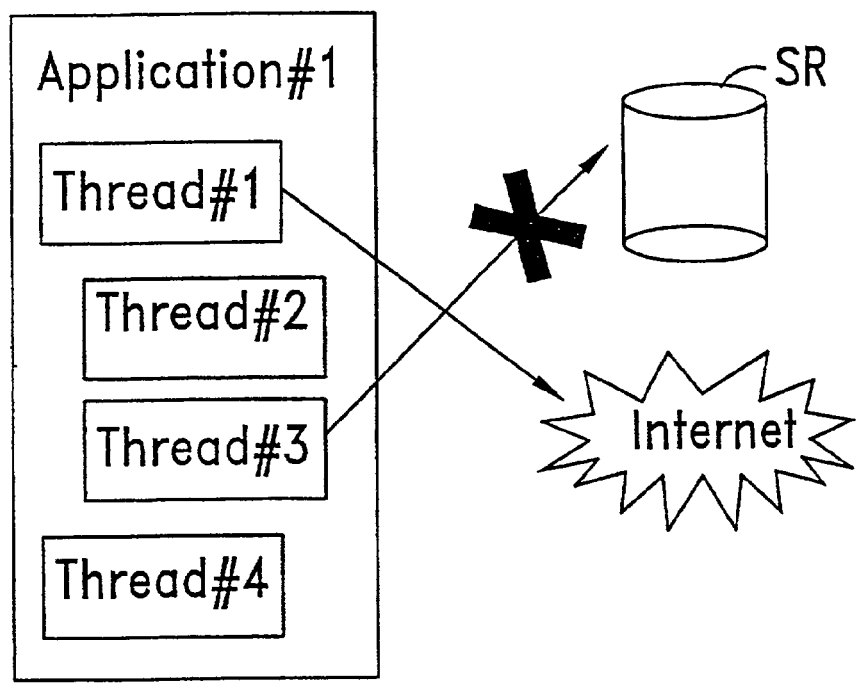

In the alternative situation depicted in FIG. 1B, only the specific thread that has exhibited Internet behavior, and any sub-thread thereof are prevented from accessing the SR, while all other threads are allowed access. In the specific example of FIG. 1B, none of Thread #1, and its sub-threads (Thread #2 and Thread #3) can access a secured resource.

According to the invention, whenever an application exhibits Internet behavior, this event is recorded in a memory (which can be located in the workstation or in the server). A record is also kept in a look-up table, of all resources that are to be kept secured. When the same application that has previously exhibited Internet behavior attempts to access one such secured resource, access to the resource is denied, unless:

1) At least a predetermined period of time has passed since the last Internet behavior; or
2) It has performed at least a preset number of operations after the Internet behavior; or
3) Another preset condition has been fulfilled.

Many pre-set conditions can be used to allow access to an otherwise barred secured resource. For instance, control may be exercised over the execution of downloadables received during such connection, to ensure that no unexecuted downloadable may access the secured resource, or the downloadables may be thoroughly analyzed to ascertain that they are harmless. For instance, many browsers provide their own sand-box for Java applets, or executable objects are certified harmless with a digital signature, or executable objects are analyzed offline or statically. The skilled person will, of course, be able to provide many different suitable conditions for this purpose.

Figure 2:
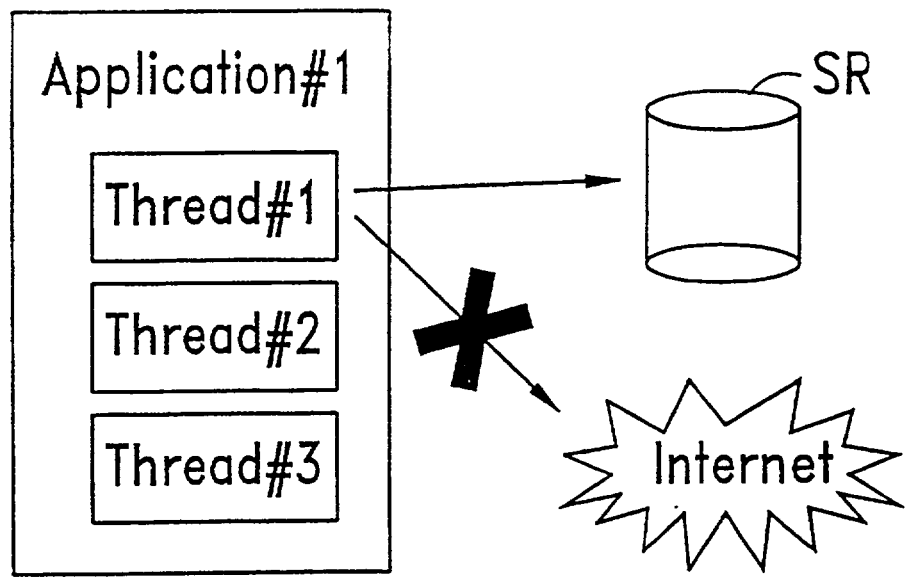
FIG. 2 schematically shows a situation in which an application that is currently accessing a secured resource is denied Internet behavior.

Turning now to FIG. 2, a different situation is shown, in which one thread of an application (Application #1) has already accessed a secured resource, SR, and is now exhibiting Internet behavior. In this situation, Internet behavior will be denied Here, again, a look-up table is kept of secured resources, so that, whenever an application attempts to exhibit Internet behavior, the memory in which a log of the resources accessed is kept is checked against the look-up table. If one of the resources currently being accessed is a secured resource, then Internet behavior is denied.

Figure 3:
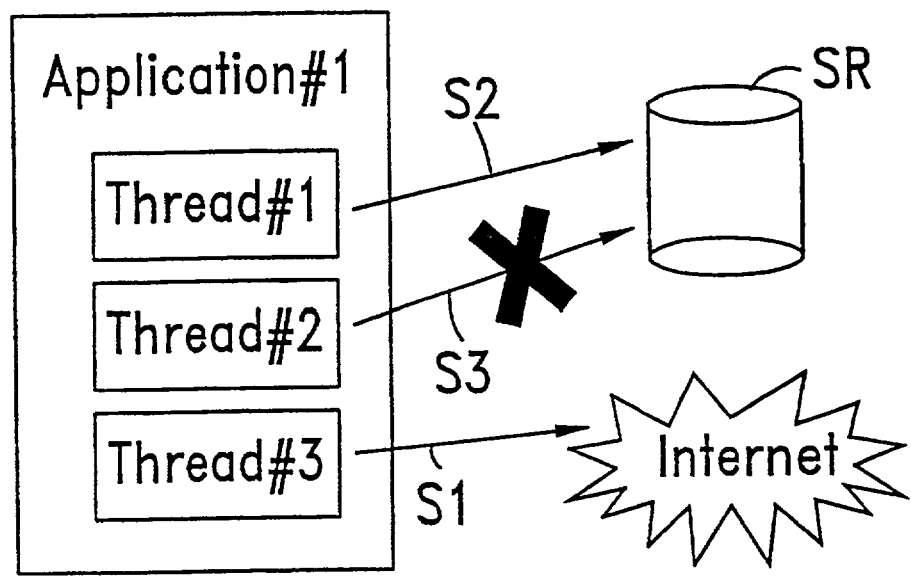
FIG. 3 further illustrates the secure resources blocking process according to the invention.

When an application receives an Internet executable (e.g., a Java or ActiveX object) it normally stores it in a temporary or cache directory and only when the entire executable has been downloaded from the Internet, one of the threads within the application accesses it and executes it. These steps are schematically shown in FIG. 3: Step 1 (S1)—A thread downloads an Internet Executable; Step 2 (S2)—A thread reads the Internet Executable from the temporary or cache directory; Step 3 (S3)—A thread attempts to access a secured resource and is denied access. Either thread can perform any or more than one step. Step 3 will be performed even if one of steps S1 or S3 has not been performed.

Of course, the above operations can be carried out within the workstation in a variety of ways, using many different programs and computer routines, which are within the skill of the routineer, and which therefore are not described herein in detail, for the sake of brevity. An example of the operations involved in handling the data and blocking access to resources is described, for instance, in the copending PCT patent application No. PCT/IL98/00084 filed on Feb. 23, 1998 (based on Israeli Patent Application No. 122314, filed Nov. 27, 1997) of the same applicant hereof, the description of which if wholly incorporated herein by reference.

All the above description of preferred embodiments has been provided for the sake of illustration, and is not intended to limit the invention in any way, except as defined by the claims. Many modifications may be effected in the invention. For instance, a variety of applications can be involved in the securing process, and their activities can be memorized and analyzed in many different ways, all without exceeding the scope of the invention.

The invention claimed is:

1. A method of preventing undesirable activities of Executable Objects via an application, comprising:
   denying one or more threads of an application access to a secured resource if said one or more threads has previously exhibited Internet behavior and has not met a specific condition for accessing said secured resource; and
   denying said one or more threads of the application Internet behavior if, at a time access is sought to the Internet, said one or more threads is accessing a secured resource.

2. A method according to claim 1, further comprising recording in a memory events representative of Internet behavior, keeping a record of all secured resources that are to be kept secured and when an application that has previously exhibited Internet behavior attempts to access one such secured resource, denying access to said secured resource, unless:
   a) At least a predetermined period of time has passed since a last Internet behavior; or
   b) Said application, or one or more of its threads, has performed at least a predetermined number of operations after exhibiting Internet behavior; or
   c) Another preset condition has been fulfilled.

3. A method according to claim 2, wherein the preset condition comprises an exercise of control over execution of downloadables received during Internet behavior, to ensure that no unexecuted downloadable may access the secured resource.

4. A method according to claim 2, wherein the present condition comprises an analysis of downloadables to ascertain the downloadables are harmless.

5. A method according to claim 1, wherein Internet behavior is denied by disabling a network connection creation.

6. A method according to claim 1, wherein Internet behavior is denied by disabling specific protocols.

7. A method according to claim 6, wherein the specific protocols comprise HTTP, FTP, SMTP, or like communication protocol.

8. A method according to claim 1, wherein Internet behavior is denied by disabling a transfer of executable objects in communication protocols.

9. A method according to claim 5, wherein access to trusted sites is not denied.

10. A method according to claim 1, wherein access to a secured resource is denied by disabling a thread using a specific system service that is used to access the secured resource.

11. A method according to claim 1, wherein all sub-threads of a thread that is denied access to a secured resource are also denied access to secured resources.

12. A method according to claim 1, wherein all sub-threads of a thread that is denied Internet behavior are also denied Internet behavior.

13. An apparatus for preventing undesirable activities of Executable Objects via an application, comprising:
   a memory for storing a record of Internet behavior of a plurality of applications; and
   means for denying one or more threads of an application access to a secured resource if said one or more threads has previously exhibited Internet behavior and has not met a specific condition for accessing said secured resource.

14. An apparatus for preventing undesirable activities of Executable Objects via an application, comprising:
   a memory of storing a record of Internet behavior of a plurality of applications; and
   means for denying one or more threads Internet behavior if, at a time access is sought, said one or more threads is accessing a secured resource.

15. A system for preventing undesirable activities of Executable Objects via an application, comprising:
   a computer on which one or more applications, each application having one or more threads, are to run, said computer being connectable to the Internet or Intranet, or Extranet, said computer being provided with a memory for storing a record of Internet behavior of each of said one or more applications; and
   means for denying one or more threads of an application access to a secured resource if said one or more threads has previously exhibited Internet behavior and has not met a specific condition for accessing said secured resource.

16. A system for preventing undesirable activities of Executable Objects via an application, comprising:
   a computer on which one or more applications, each application having one or more threads, are to run, said computer being connectable to the Internet or Intranet or Extranet, said computer being provided with a memory for storing a record of Internet behavior of each of said one or more applications; and
   means for denying one or more threads Internet behavior if, at a time Internet behavior is exhibited, said one or more threads is accessing a secured resource.

17. A method according to claim 2, wherein Internet behavior is denied by disabling a network connection creation.

18. A method according to claim 3, wherein Internet behavior is denied by disabling a network connection creation.

19. A method according to claim 4, wherein Internet behavior is denied by disabling a network connection creation.

20. A method according to claim 2, wherein Internet behavior is denied by disabling specific protocols.

21. A method according to claim 3, wherein Internet behavior is denied by disabling specific protocols.

22. A method according to claim 4, wherein Internet behavior is denied by disabling specific protocols.

23. A method according to claim 20 wherein the specific protocols comprise HTTP, FTP, SMTP, or like communication protocol.

24. A method according to claim 21, wherein the specific protocols comprise HTTP, FTP, SMTP, or like communication protocol.

25. A method according to claim 22, wherein the specific protocols comprise HTTP, FTP, SMTP, or like communication protocol.

26. A method according to claim 2, wherein Internet behavior is denied by disabling a transfer of executable objects in communication protocols.

27. A method according to claim 3, wherein Internet behavior is denied by disabling transfer of executable objects in communication protocols.

28. A method according to claim 4, wherein Internet behavior is denied by disabling a transfer of executable objects in communication protocols.

29. A method according to claim 1, wherein access to trusted sites is not denied.

30. A method according to claim 2, wherein access to a secured resource is denied by disabling a thread using a specific system service that is used to access the secured resource.

31. A method according to claim 3, wherein access to a secured resource is denied by disabling a thread using a specific system service that is used to access the secured resource.

32. A method according to claim 4, wherein access to a secured resource is denied by disabling a thread using a specific system service that is used to access the secured resource.

* * * * *